Aug. 29, 1967     J. R. RITZEMA     3,338,115
HYDROKINETIC FLUID DRIVE
Filed May 18, 1964
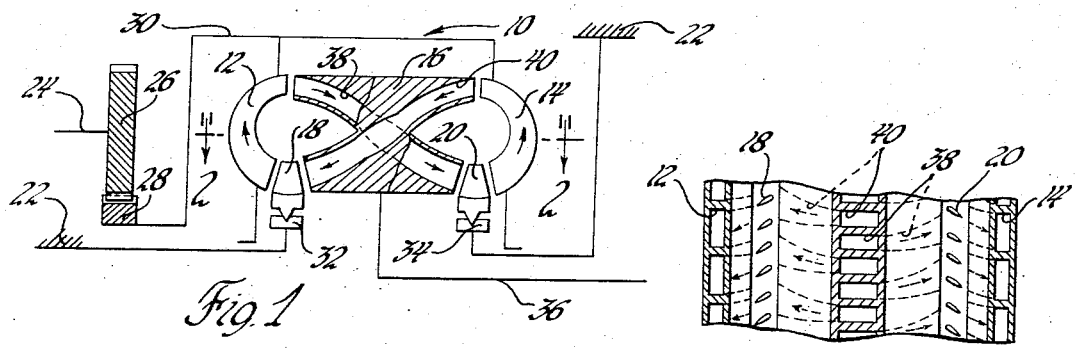
Fig. 1
Fig. 2
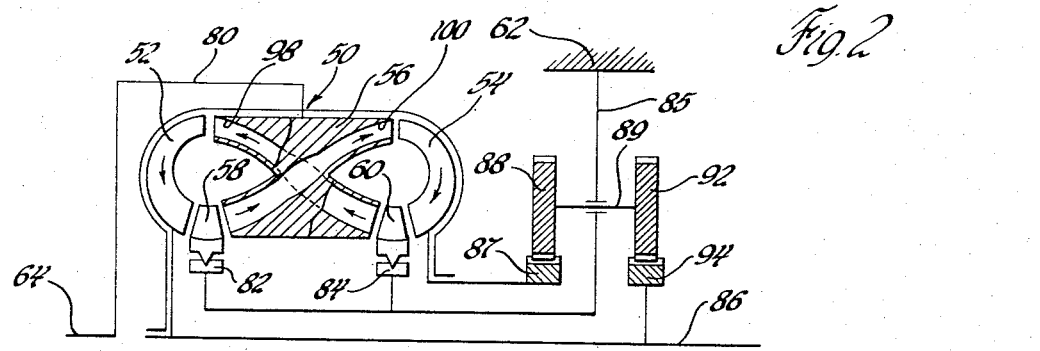
Fig. 3
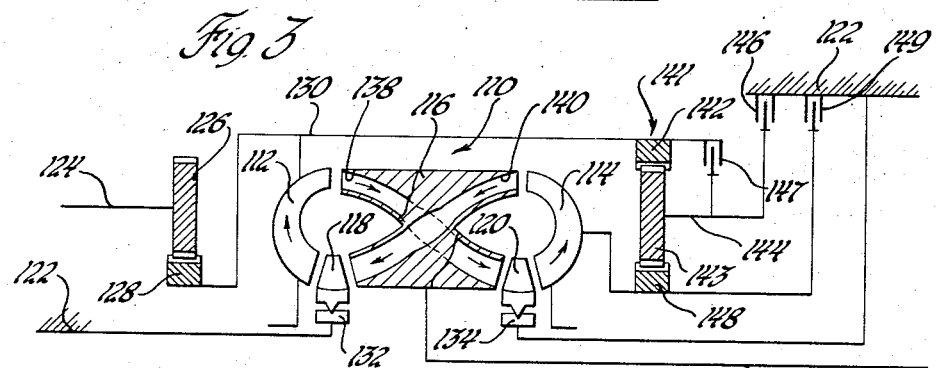
Fig. 4
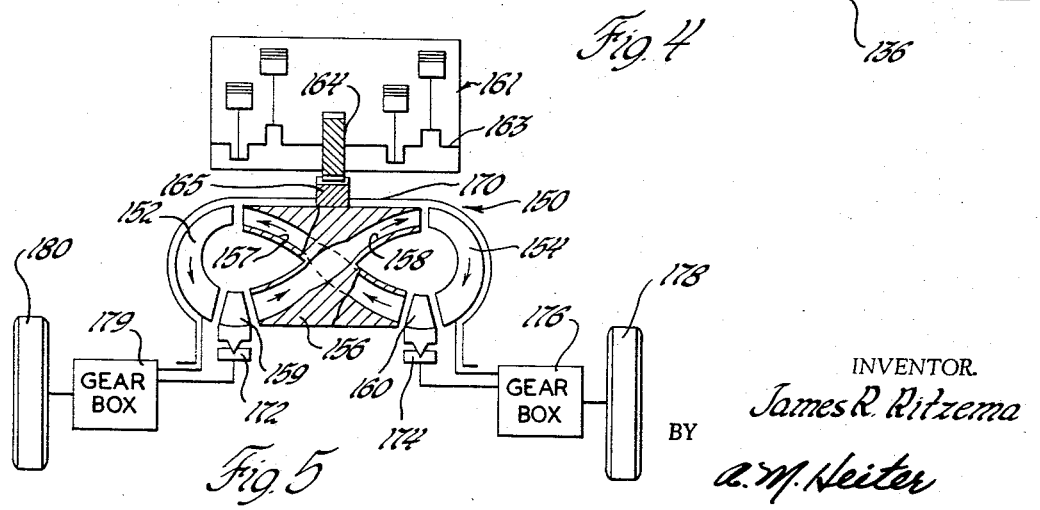
Fig. 5
INVENTOR.
James R. Ritzema
BY
a. m. Heiter
ATTORNEY United States Patent Office 3,338,115
Patented Aug. 29, 1967

3,338,115
HYDROKINETIC FLUID DRIVE
James R. Ritzema, Birmingham, Mich., assignor to General Motors Corporation, Detroit, Mich., a corporation of Delaware
Filed May 18, 1964, Ser. No. 368,146
19 Claims. (Cl. 74—730)

This invention relates to hydrokinetic fluid drives and more particularly to hydrokinetic fluid couplings and torque converters.

The most common types of hydrokinetic fluid couplings and torque converters operate by causing the working fluid to travel under closed-cycle conditions around the path of a closed annular vortex thus requiring the fluid to make a continuous tight bend for each complete fluid cycle around the vortex. As a result of this continuous sharp turning and dependent on the fluid velocity, there occurs fluid separation resulting in energy loss of varying magnitudes which reduces the efficiency of energy conversion. In the less common types of hydrokinetic fluid couplings and torque converters which operate by causing the working fluid to travel under closed-cycle conditions around a tortuous annular path, the efficiency of energy conversion is further reduced below the efficiency level for nontortuous annular flow since the fluid must turn for each curvature in the winding fluid path.

The hydrokinetic fluid drive of this invention reduces the separation loss to increase energy conversion by providing a smoother path for fluid flow and in addition is adaptable for single and divided input which includes a controlled input for hydrokinetic braking and single and divided output which includes separate outputs for fluid drive use as a differential in place of the conventional geared differential in the drive train.

The hydrokinetic fluid drive of this invention operates by causing the working fluid to travel under closed-cycle conditions around the path of a pair of interconnected annular vortexes as traced by a nonintersecting double looped or figure eight curve. The fluid drive structure comprises a rotatable central dual path member providing separate crossover passages and a rotatable outer member on each side of the central dual path member providing curved passages in the loop portions operatively connecting the terminal ends of the separate crossover passages to provide a closed figure eight fluid coupling circuit. The pair of outer members can serve as the input means for the fluid drive to impart kinetic energy to the fluid and in this instance serves as two separate pump means with the central dual path member serving as the turbine means to provide the output of the fluid drive. The central dual path member can also serve as the input means to impart kinetic energy to the fluid and in that instance acts as the pump means with the pair of outer members serving as the turbine means to provide a single fluid drive output or two separate outputs. Where torque multiplication is desired, stator means are placed in each loop to redirect the fluid flow between the turbine means and pump means to provide closed figure eight torque converter circuitry.

When the pair of outer members serve as a separate pump means, power input from a prime mover may be equally divided between the separate pump means and if hydrodynamic braking is desired one of the pump means can be disconnected from the prime mover and held stationary for moderate braking or the prime mover can drive one of the pump means in reverse for greater braking.

When the central dual path member serves as the pump means, the outer members which then serve as the turbine means can be connected to provide a single output and can also be connected individually through suitable separate drive means to provide separate outputs for differential fluid drive.

It is an object of this invention to provide a hydrokinetic fluid drive having a new and improved fluid flow path.

It is another object of this invention to provide a new and improved hydrokinetic fluid drive adapted for single and divided input including a controlled input for hydrokinetic braking and single and divided output including separate outputs for differential fluid drive.

It is another object of this invention to provide a hydrokinetic fluid drive which operates by causing the working fluid to travel under closed-cycle conditions around the path of a pair of interconnected annular vortexes.

It is another object of this invention to provide a hydrokinetic fluid drive having a flow path including a pair of pump flow paths and a pair of turbine flow paths with one pair having curved portions and the other pair combining substantially straight portions and curved portions and the curved portions having a radius of curvature at least half the minimum torus diameter.

It is another object of this invention to provide a hydrokinetic fluid drive having a flow path including a pair of pump flow paths and a pair of turbine flow paths with one pair of substantially constant curvature and the other pair being arranged to cross over each other and having substantially straight portions and portions having an initial radius of curvature at least half the minimum diameter of the torus.

It is another object of this invention to provide a hydrokinetic fluid drive having a rotatable central dual path member serving as pumping means and providing separate crossover passages, and a rotatable outer member serving as pump means on each side of the central dual path member providing curved passages operatively connecting the terminal ends of the separate crossover passages to provide closed figure eight fluid coupling circuitry.

It is another object of this invention to provide a hydrokinetic fluid drive having a rotatable central dual path member serving as turbine means and providing separate crossover passages, and a rotatable outer member serving as pump means on each side of the central dual path member providing curved passages operatively connecting the terminal ends of the separate crossover passages to provide closed figure eight fluid coupling circuitry.

It is another object of this invention to provide a hydrokinetic fluid drive having a rotatable central dual member serving as pump means and providing separate crossover passages, a rotatable outer member on each side of the central dual path member serving as turbine means and providing curved passages, stator means providing passages to redirect flow between the turbine means and the pump means and the pump passages, turbine passages and stator passages being arranged to provide closed nonintersecting double looped torque converter circuitry.

It is another object of this invention to provide a hydrokinetic fluid drive comprising a rotatable central dual path member serving as turbine means and providing separate crossover passages, a rotatable outer member on each side of the central dual path member serving as pump means and providing curved passages, stator means to redirect flow between the turbine means and pump means, and the pump passages, turbine passages and stator passages being arranged to provide closed nonintersecting double looped torque converter circuitry.

It is another object of this invention to provide a hydrokinetic fluid drive which operates by causing the working fluid to travel under closed-cycle conditions around the path of a nonintersecting double looped curve and includes separate pump means one of which can be driven in the same direction and speed as the other pump means and can also be driven in a reverse direction and held stationary to provide hydrokinetic braking.

It is another object of this invention to provide a hydrokinetic fluid drive which operates by causing the working fluid to travel under closed-cycle conditions around the path of a nonintersecting double looped curve and includes separate turbine means which can provide a combined single output and can also provide separate outputs for differential fluid drive.

These and other objects of the invention will be more apparent from the following description of the preferred embodiments of the invention illustrated in the accompanying drawing in which:

FIGURE 1 is a diagrammatic showing of the upper one half of one embodiment of a hydrokinetic fluid drive unit possessing features of this invention.

FIGURE 2 is a representative view taken on the line 2—2 in FIGURE 1.

FIGURE 3 is a diagrammatic showing of the upper one half of another embodiment of a hydrokinetic fluid drive unit possessing features of this invention.

FIGURE 4 is a modification of the hydrokinetic fluid drive unit shown in FIGURE 1.

FIGURE 5 is a modification of the hydrokinetic fluid drive unit shown in FIGURE 3.

Referring first to FIGURE 1, the hydrokinetic fluid drive unit generally designated at 10 basically comprises a pair of rotatable vaned pumps 12 and 14, a rotatable twin turbine 16 centrally located between pumps 12 and 14, a vaned stator 18 between one exit side of turbine 16 and the entrance side of pump 12 and another vaned stator 20 located between another exit side of turbine 16 and the entrance side of pump 14, all mounted in a transmission housing 22.

Input to drive pumps 12 and 14 in a forward direction is from a suitable prime mover, not shown, via a mechanical drive which includes a prime mover driven shaft 24 driving a gear 26 in mesh with an externally toothed annular gear 28 rigidly connected to a pump housing 30. Pump housing 30 in addition to rigidly connecting pumps 12 and 14 to gear 28 generally also provides the rotating fluid drive housing enclosing the fluid drive blading.

The stators 18 and 20 are prevented from reverse rotation by one-way brakes 32 and 34 respectively which are grounded to the transmission housing 22 and which are operable to permit overrunning of stators 18 and 20 in the forward direction in the known manner. Stators 18 and 20, which may also be controlled by suitable pitch control means, act as the reactionary members in the fluid drive to collect the flow from turbine 16 and redirect the flow to pumps 12 and 14 respectively with drive in the forward direction being taken from turbine 16 via an output shaft 36.

The working fluid as shown by the directional arrows travels under closed-cycle conditions around the path of a pair of interconnected annular vortexes as traced by a nonintersecting double looped or figure eight curve the two vortexes or loop centers being located equidistant from the common central axis of the pumps 12, 14, twin turbine 16 and stators 18, 20. This fluid path is provided by the arrangement of the fluid drive members in which the twin turbine 16 is a central dual path member having circumferentially spaced and separated turbine passages 38 and 40 which cross over each other at their midpoints as shown in FIGURES 1 and 2. Turbine passages 38 are arranged to receive the fluid from the exit side of pump 12 and deliver the fluid to the entrance side of stator 20 for subsequent delivery to the entrance side of pump 14. The turbine passages 40 are arranged to receive the fluid from the exit side of pump 14 and deliver the fluid to the entrance side of stator 18 for subsequent delivery to the entrance side of pump 12.

In the region where turbine passages 38 and 40 cross each other, the heights of these passages both upstream and downstream of the crossover points gradually increase reaching a maximum at the crossover points to compensate for their gradual decrease in widths which permits the cross over so that their areas are either substantially equal to their areas immediately upstream and downstream of the crossover region or gradually decrease in the direction of fluid flow. This discourages fluid separation which might otherwise be promoted if a diverging flow condition were permitted to occur immediately downstream of the crossover region. The areas of turbine passages 38 and 40 gradually become smaller towards their exit ends to provide both a converging flow condition for insuring against flow separation and a high flow velocity at the entrances to the pumps 12 and 14 as will be explained in greater detail later.

The vanes of the pumps 12, 14 and stators 18, 20 and the turbine passages 38 and 40 are designed to provide entrance and exit angles which offer the least flow resistance with pumps 12 and 14 providing the greatest curvature for bending the flow in the looped portions of the flow path and the turbine passages 38 and 40 and vaned stators 18 and 20 providing a gradual curvature so that separation losses may be reduced and greater efficiency of energy conversion can be gained.

Describing now the operation, when the prime mover is started shaft 24 immediately begins to rotate pump housing 30 in the forward direction with power input being equally divided between pumps 12 and 14. As pumps 12 and 14 rotate, they impart a centrifugal force to the fluid which throws the fluid out their exit sides and into the passages 38 and 40. The fluid flowing through turbine passages 38 then flows through stator 20 to enter the entrance side of pump 14 and fluid flowing through turbine passages 40 flows through stator 18 to enter the entrance side of pump 12. Since the load, not shown, to which turbine output shaft 36 is drivingly connected is originally at a standstill, turbine 16 is also stationary. With the prime mover idling, the fluid emerging from pumps 12 and 14 has comparatively little speed and circulates around the pair of annular vortexes provided by this flow path without imparting motion to turbine 16. To accelerate the load, the prime mover is accelerated to rapidly increase the speed of pumps 12 and 14 up to a point where a relatively high torque is produced by the prime mover, the maximum prime mover speed that can be obtained while turbine 16 remains stationary being known as the stall point which occurs within the range of prime mover speed at which maximum torque is produced.

The high torque output of the prime mover is reflected in fluid drive unit 10 in the form of greatly increased speed of the pumps 12 and 14 which then hurl a considerable amount of fluid from their exit sides into the entrances to turbine passages 38 and 40 respectively. The turbine passages 38 and 40 are shaped to effect a maximum redirection of the fluid streams so that a direct force is brought to bear on turbine 16 with the direction of the fluid which leaves turbine passages 38 and 40 being opposite to that of the forward rotation of the pumps 12 and 14.

While the turbine 16 remains stationary, it cannot extract work from the fluid that is being directed by its passages. If no turbine work is extracted, the fluid loses none of its energy in the process of fluid reversal except for small friction losses. However, when the fluid leaves turbine passages 38 and 40 the fluid stream has a greater velocity than when it was discharged from pumps 12 and 14 since turbine passages 38 and 40 gradually become smaller near their exits. The stators 18 and 20 are designed to receive the fluid stream as it emerges from the turbine passages 40 and 38 respectively and to turn it once more in the direction of forward rotation of the pumps 12 and 14, the stators 18 and 20 being held stationary against the force of the impinging fluid streams by the locking action of the one-way brakes 32 and 34 respectively.

Like turbine 16 which still is presumed to be stationary, stators 18 and 20 can extract no work and very little energy from the streams of fluid. But since there must be an equal and opposite reaction for every action, stators 18 and 20 exert a great resultant force upon the fluid stream returning it to the direction of pump rotation with little loss in velocity. Because the fluid is moving in the same direction, the high velocity fluid stream leaving stators 18 and 20 enters pumps 12 and 14 smoothly. Its velocity is then added to that developed in pumps 12 and 14 so that the total velocity at the exits of the pumps 12 and 14 is correspondingly greater. This regenerative action is the key to the torque multiplication process in the hydrokinetic torque converter.

Since the torque applied to turbine 16 increases with the amount of fluid projected into it, the greater the pumps output velocities the greater will be the torque on the turbine. The prime mover torque applied to pumps 12 and 14 is capable of accelerating fluid in the fluid drive unit from rest to a certain velocity. Then, if fluid already flowing in the same direction with considerable velocity is supplied to the pumps entrances, the pumps output velocities become the sum of the velocity due to prime mover torque and the regenerative, or additional, input velocity.

Up to now it has been expedient to assume that turbine 16 remain stationary when the prime mover torque is applied through pumps 12 and 14. This, however, is not the case since turbine 16 is connected to the load and is held stationary only until the torque applied to it is sufficient to overcome the inertia of the load. Since rapid acceleration is desired, the prime mover is caused to continuously accelerate. Both pumps 12 and 14 and turbine 16 begin to pick up speed, but pumps 12 and 14 are still rotating much faster than the turbine 16. The fluid continues to travel about the double looped flow path at a considerable velocity producing continuous torque multiplication. However, as the load to be accelerated does accelerate the need for torque multiplication diminishes.

It will be observed that the fluid flow thus far described has all been around the double looped flow path of the fluid drive unit. This circulation from pumps 12 and 14 to turbine 16 to the stators 18 and 20 and back to the pumps 12 and 14 can be described as an open annular vortex type of flow as contrasted to the common closed annular vortex type of flow and varies from a maximum at the stall point to a minimum at the cruising speed. As turbine 16 begins to rotate, it can be seen that the fluid in the fluid drive unit will also be carried around the periphery of the fluid drive unit resulting in what is called rotary flow. This rotary motion of the fluid becomes greater and the open vortex flow diminishes as the speed of turbine 16 approaches that of pumps 12 and 14. However, both the open vortex and rotary flow are always present in the fluid drive unit when the prime mover is driving the load because turbine speed never quite obtains pump speed. It is the open vortex flow which provides both the torque multiplication and fluid coupling within the fluid drive unit.

As the load accelerates, the turbine speed increases causing the open annular vortex type of flow in the fluid drive unit to lessen and rotary flow to become greater. The more rapid rotation of turbine 16 creates centrifugal forces like those in the pumps 12 and 14. As these forces increase with speed in turbine passages 38 and 40, they resist the fluid flow being projected into these passages from pumps 12 and 14. The faster moving turbine now runs away from the stationary stators 18 and 20 reducing the effective velocity of the fluid discharged against the stators thus reducing the velocity of the fluid stream when it is redirected into pumps 12 and 14 by the stators 18 and 20. Furthermore, the increase in prime mover speed as the load accelerates similarly causes pumps 12 and 14 to run away from stators 18 and 20 more rapidly. This further reduces the effectiveness of the fluid input velocity from the stators even though the basic pump output flow rates are increased with faster pump rotation.

The overall effect of these changes is to reduce the open vortex fluid flow and regenerative effect from stators 18 and 20. Velocity of the fluid stream entering pumps 12 and 14 is gradually decreased, reducing, in turn both the fluid velocity at the pumps exits and the force on the turbine 16, and this process continues until all torque multiplication ceases and only prime mover torque is delivered to the turbine 16.

As the rotational speed of turbine 16 increases and approaches the speed of pumps 12 and 14, the direction of the fluid flow from the exits of the turbine passages 38 and 40 changes so that the fluid flow exerts a force on the backs of the vanes of the stators 18 and 20. Since this condition would cause turbulence resulting in increased friction and power loss, the one-way brakes 32 and 34 which brake only in a direction opposite to that of pump and turbine rotation, permit stators 18 and 20 to freewheel and be carried along with the rotating fluid mass.

The hydrokinetic fluid drive unit 50 shown in FIGURE 3 comprises a pair of rotatable vaned turbines 52 and 54, a rotatable twin pump 56 located between turbines 52 and 54, a vaned stator 58 between the exit of the turbine 52 and one entrance side of pump 56 and another vaned stator 60 between the exit of the turbine 54 and another entrance side of pump 56, all located within a transmission housing 62.

Input to drive pump 56 in the forward direction is by an input shaft 64 which is rigidly connected to the pump housing 80 which also generally provides the fluid drive housing for the fluid drive blading. One-way brakes 82 and 84 for the stators 58 and 60 are grounded through a web 85 of the transmission housing 62. Output from the turbines 52 and 54 is by a common output shaft 86 with the turbine 52 being directly connected thereto and the vaned turbine 54 being connected thereto via a gear train drive which provides a 1:1 drive ratio. The gear train drive comprises an external toothed annular input gear 87 rigidly connected to the turbine 54 in mesh with a first transfer gear 88 which is rigidly connected to a countershaft 89 rotatably supported in the web 85. The countershaft 89 is rigidly connected to a second transfer gear 92 which is in mesh with an output gear 94 rigidly connected to the output shaft 86. To provide the 1:1 drive ratio, gears 88 and 92 are of the same size and the gears 87 and 94 are of the same size.

The pump 56 which is the central dual path member has crossover passages 98 and 100 like the crossover passages 38 and 40 shown in FIGURE 1 and unlike the functioning of the passages 38 and 40 in FIGURE 1 are suitably designed to serve as pump passages rather than turbine passages. The direction of fluid flow about the double looped path provided by the arrangement of these fluid drive members is indicated by the directional arrows. Upon rotation of pump 56 in the forward direction, the centrifugal force imparted to the fluid in pump passages 98 forces this fluid to flow radially outwardly to enter the turbine 52 and likewise the centrifugal force imparted to the fluid in pump passages 100 forces this fluid to flow radially outwardly to enter the turbine 54. Fluid is thence delivered through the turbine 52 to enter the stator 58 which redirects the flow to enter the pump passages 100 in the same direction as pump rotation and the turbine 54 delivers the fluid to stator 60 which redirects the flow to enter the pump passages 98 in the same direction as pump rotation. Again, like the fluid drive unit shown in FIGURE 1, the fluid travels under closed-cycle conditions around the smooth double looped flow path provided by the curved pump passages 98, 100 and the vanes of turbines 52, 54 and stators 58, 60 resulting in high level energy conversion. The fluid drive unit 50 functions to provide its greatest torque multiplication at stall with this torque multiplication gradually decreasing until coupling speed is obtained whereafter the stators 58 and 60 are permitted to freewheel in the forward direction of rotation by the one-way brakes 82 and 84.

The fluid drive unit 110 shown in FIGURE 4 is a modification of the fluid drive unit 10 shown in FIGURE 1 and provides for two different degrees of hydrodynamic braking. The fluid drive unit 110 comprises rotatable vaned pumps 112 and 114, a twin turbine 116 located between pumps 112 and 114, and vaned stators 118 and 120, all housed within a transmission housing 122. Input is via the input shaft 124 driving the gear 126 which is in mesh with a gear 128, the latter gear being rigidly connected to the pump housing 130 which also generally provides the fluid drive housing for the fluid drive blading. Stators 118 and 120 are prevented from reverse rotation by the one-way brake 132 and 134 respectively which are grounded to the transmission housing 122 and output from the turbine 116 which has the crossover turbine passages 138 and 140 is via the output shaft 136.

In this instance, only the pump 112 is directly connected to the pump housing 130 and a planetary gear drive generally designated at 141 is provided which is operable to drivingly connect the pump 114 to the pump housing 130 so that the pump 114 may be either driven in the same direction and at the same speed as pump housing 130 and pump 112 or may be driven in reverse. The planetary gear drive includes a ring gear 142 rigidly connected to the pump housing 130 meshing with planetary pinions 143 supported on a planet carrier 144 which may be either held stationary by a reverse drive brake 146 or connected to the ring gear 142 by engagement of a lockup clutch 147. Pinions 143 mesh with a sun gear 148 which is rigidly connected to the pump 114. Another brake 149 when engaged is effective to hold both the sun gear 148 and pump 114 stationary.

When the lockup clutch 147 is engaged and the remaining friction devices are disengaged, the planetary gear drive 141 is effectively locked up and the pump 114 conjointly rotates in the forward direction with pump 112 and the fluid drive unit 110 operates in the same manner as fluid drive unit 10, flow being in the direction of the arrows.

For moderate hydrodynamic braking, the reverse drive brake 146 and lockup clutch 147 are disengaged and only the brake 149 is engaged to hold stationary the pump 114 which then acts as a reaction member and no longer takes part in the process of imparting energy. Since turbine 116 is rotating forwardly, the fluid thrown from turbine passages 138 to the stationary stator 120 and thence redirected by stator 120 to the now stationarily held pump 114 for return to the turbine passages 140 is in the form of high velocity fluid jets which are continually sheared as they travel between the stationary stator 120 and pump 114 and the rapidly moving turbine passages 138 and 140.

Since this shearing energy must come from the turbine 116, the output shaft 136 is retarded by a retarding effect which theoretically increases as the square of the relative speed difference between the turbine 116 and the pump 114 and stator 120, the speed difference in this instance being turbine speed.

For greater hydrokinetic braking, the lockup clutch 147 and the brake 149 are disengaged and the reverse drive brake 146 is engaged so that the planet carrier 144 then acts as the reaction member of planetary gear drive 141. Since the pump housing 130 and ring gear 142 are rotating in the forward direction, the pinions 143 rotate about their own axes and drive the sun gear 148 and connected pump 114 in the reverse direction, which is opposite the direction of forward rotation of the turbine 116, and at an increased speed. Since the turbine 116 and pump 114 are rotating in opposite directions, the retarding effect resulting from shearing of the fluid as it travels between the pump 114 and turbine 116 is increased since the relative speed difference now becomes the sum total of their respective speeds. In addition, there occurs the retarding effect due to fluid shear as it travels between the forwardly rotating turbine 116 and stationary stator 120 and between the stator 120 and pump 114 which is rotating in reverse. Under these conditions, the fluid exiting from the turbine passages 138 is not only prevented from rotary motion in the forward direction but is also known in the reverse direction by the pump 114 whereby the fluid exiting from the pump 114 will tend to drive the turbine 116 in reverse to further contribute to the braking effect.

Referring now to FIGURE 5, there is shown a hydrokinetic fluid drive unit 150 which is a modification of the hydrokinetic fluid drive unit 50 shown in FIGURE 3 for use as a differential fluid drive in a vehicle. The fluid drive unit 150 comprises rotatable vaned turbines 152 and 154, a rotatable twin pump 156 having crossover turbine passages 157 and 158 located between turbines 152 and 154 and vaned stators 159 and 160. Input for the fluid drive unit is from an internal combustion piston engine 161 whose longitudinal axis is transverse of the longitudinal axis of the vehicle chassis, not shown. Engine 161 has a crankshaft 163 rigidly connected to a gear 164 in mesh with an externally toothed annular gear 165 which is rigidly connected to the pump housing 170.

One-way brakes 172 and 174 prevent reverse rotation of the stators 159 and 160 and permit overrunning of the stators in the forward direction, the operation of this fluid drive unit being basically the same as that of the fluid drive unit 50 shown in FIGURE 3 with fluid flow being in the direction of the arrows. In this instance, however, instead of the outputs of the turbines 152 and 154 being combined to provide a common output, the turbine 154 provides a separate input to a selectively controlled variable ratio gear box 176 to drive one driven wheel 178 of the vehicle and the turbine 152 provides a separate input to another selectively controlled variable ratio gear box 179 identical to gear box 176 to drive the other driven wheel 180 and the one-way brakes 172 and 174 are grounded through the gear boxes 179 and 176 respectively.

In the forward drive ranges and reverse, the gear boxes 176 and 179 which serve to extend the range of usefulness of the fluid drive are controlled to provide identical drive ratios between the turbine 154 and wheel 178 and between the turbine 152 and wheel 180. Since turbines 152 and 154 are not mechanically interconnected nor are they mechanically connected to the pump 156 but rather they are hydraulically connected through the operation of fluid flow, the turbines 152 and 154 may revolve relative to the pump 156 and may also revolve relative to each other as the result of reaction torque from the wheels 178 and 180 during turning of the vehicle to permit the hydrokinetic drive unit 150 to serve as a differential fluid drive to the wheels.

While the above hydrokinetic fluid drive units are illustrated as being of the torque converter type by the employment of the vaned stators to provide redirection of the flow and torque multiplication, it will be readily understood that these vaned stators may be removed without departing from the scope of this invention so that the hydrokinetic fluid drive units can be used as fluid couplings where that type of operation is desired.

The above-described preferred embodiments are illustrative of the invention which may be modified within the scope of the appended claims.

I claim:
1. In a hydrokinetic fluid drive,
 (a) a hydrokinetic fluid drive unit comprising rotary input means and rotary output means cooperatively providing closed fluid circuit means containing fluid,

(b) said input means comprising centrifugal pumping means operable when driven to impart kinetic energy only by centrifugal action to the fluid contained in said closed fluid circuit means, said output means being responsive to be driven by the kinetic energy imparted to the fluid contained in said closed fluid circuit means, (c) and said closed fluid circuit means having a continuous non-intersecting fluid path which crosses over itself.

2. In a hydrokinetic fluid drive,
(a) a hydrokinetic fluid drive unit comprising input means and output means which are rotatable only about a single common central axis and have closed fluid circuit means containing fluid,
(b) said input means being operable when driven to impart kinetic energy to the fluid contained in said closed fluid circuit means, said output means being responsive to be driven by the kinetic energy imparted to the fluid contained in said closed fluid circuit means,
(c) and said closed fluid circuit means having a continuous double loop fluid path which crosses over itself and whose loop centers are at the same radius from said central axis.

3. In a hydrokinetic fluid drive,
(a) a hydrokinetic fluid drive unit comprising a pair of pumps and a turbine providing closed fluid circuit means containing fluid,
(b) said pumps being operable when driven to impart kinetic energy to the fluid contained in said closed fluid circuit means, said turbine being responsive to be driven by the kinetic energy imparted to the fluid contained in said closed fluid circuit means,
(c) and said closed fluid circuit means providing a fluid path traced by a nonintersecting figure eight curve.

4. In a hydrokinetic fluid drive,
(a) a hydrokinetic drive unit comprising a pump and a pair of turbines providing closed fluid circuit means containing fluid,
(b) said pump being operable when driven to impart kinetic energy to the fluid contained in said closed fluid circuit means, said turbines being responsive to be driven by the kinetic energy imparted to the fluid contained in said closed fluid circuit means,
(c) and said closed fluid circuit means providing a fluid path traced by a nonintersecting figure eight curve.

5. The hydrokinetic fluid drive set forth in claim 4 and said turbines being drivingly connected to each other to provide a combined single output.

6. In a hydrokinetic fluid drive,
(a) a hydrokinetic fluid drive unit comprising input means and output means providing closed fluid circuit means containing fluid,
(b) said closed fluid circuit means providing a fluid path traced by a nonintersecting double looped curve whereby said hydrokinetic fluid drive unit operates to drive said output means by causing fluid to flow around the fluid path traced by said nonintersecting double looped curve when said input means is driven,
(c) said input means including a pair of pumps arranged so that one of said pumps provides a portion of said closed fluid circuit means in one of the loops of said double looped curve and the other of said pumps provides a portion of said closed fluid circuit means in the other loop of said double looped curve,
(d) and said output means including a twin turbine which is arranged between said pumps and provides separate crossover passages for said closed fluid circuit means effective to interconnect said looped portions provided by said pumps.

7. The hydrokinetic fluid drive set forth in claim 6 and said fluid circuit means having reaction means including stator means arranged between each said pump and said twin turbine.

8. In a hydrokinetic fluid drive,
(a) a hydrokinetic fluid drive unit comprising input means and output means which are rotatable about a common axis and have closed fluid circuit means containing fluid,
(b) said closed fluid circuit means providing a fluid path traced by a nonintersecting double looped curve whereby said hydrokinetic fluid drive unit operates to drive said output means by causing fluid to flow around the fluid path traced by said nonintersecting double looped curve when said input means is driven,
(c) said output means including a pair of turbines arranged so that one of said turbines provides a portion of said closed fluid circuit means in one of the loops of said double looped curve and the other of said turbines provides a portion of said closed fluid circuit means in the other loop of said double looped curve,
(d) and said input means including a twin pump which is arranged between said turbines and provides separate crossover passages for said closed fluid circuit means effective to interconnect said looped portions provided by said turbines.

9. The hydrokinetic fluid drive set forth in claim 8 and said fluid circuit means having reaction means including stator means arranged between each said turbine and said twin pump.

10. In a hydrokinetic fluid drive,
(a) a hydrokinetic fluid drive unit comprising input means and output means which are rotatable about a common central axis and have closed fluid circuit means containing fluid,
(b) said closed fluid circuit means providing a fluid path traced by a nonintersecting double looped curve whose loop centers are equidistant from said central axis whereby said hydrokinetic fluid drive unit operates to drive said output means by causing fluid to flow around the fluid path traced by said nonintersecting double looped curve when said input means is driven,
(c) said input means including a pair of pumps arranged so that one of said pumps provides a portion of said closed fluid circuit means in one of the loops of said double looped curve and the other of said pumps provides a portion of said closed fluid circuit means in the other loop of said double looped curve,
(d) and said output means including a twin turbine which is arranged between said pumps and provides separate crossover passages for said closed fluid circuit means effective to interconnect said looped portions provided by said pumps.

11. In a hydrokinetic fluid drive,
(a) a hydrokinetic fluid drive unit comprising input means and output means which are rotatable about a common central axis and have closed fluid circuit means containing fluid,
(b) said closed fluid circuit means providing a fluid path traced by a nonintersecting double looped curve whose loop centers are equidistant from said central axis whereby said hydrokinetic fluid drive unit operates to drive said output means by causing fluid to flow around the fluid path traced by said nonintersecting double looped curve when said input means is driven,
(c) said input means including a twin pump which is arranged between said turbines and provides separate crossover passages for said closed fluid circuit means effective to interconnect said looped portions provided by said turbines,
(d) and said output means including a pair of turbines arranged so that one of said turbines provides a portion of said closed fluid circuit means in one of the loops of said double looped curve and the other of said turbines provides a portion of said closed fluid circuit means in the other loop of said double looped curve.

12. In a hydrokinetic fluid drive,
(a) a hydrokinetic fluid drive unit comprising input means, reaction means and output means providing closed fluid circuit means containing fluid,
(b) said closed fluid circuit means providing a fluid path traced by a nonintersecting double looped curve whereby said hydrokinetic fluid drive unit operates to drive said output means by causing fluid to flow around the fluid path traced by said nonintersecting double looped curve when said input means is driven,
(c) said input means including a twin pump which is arranged between said turbines and provides separate crossover passages for said closed fluid circuit means,
(d) said output means including a pair of turbines arranged so that one of said turbines provides a portion of said closed fluid circuit means in one of the loops of said double looped curve and the other of said turbines provides a portion of said closed fluid circuit means in the other loop of said double looped curve,
(e) said reaction means including stator means between each said turbine and said twin pump,
(f) and selectively controlled variable ratio drive means operable to drivingly connect each said turbine to a separate load in a plurality of different drive ratios with said hydrokinetic fluid drive unit being effective to serve as a differential fluid drive to said loads.

13. In a hydrokinetic fluid drive,
(a) a hydrokinetic fluid drive unit comprising a pair of pumps and a twin turbine providing closed fluid circuit means containing fluid,
(b) said fluid circuit means providing a fluid path traced by a nonintersecting double looped curve,
(c) said pair of pumps having passage means providing the outer curvature of the looped portions of said looped curve for said closed fluid circuit means and being effective when driven in one direction to impart kinetic energy to the fluid contained in said fluid circuit means, said twin turbine being arranged between said pumps and having crossover passage means providing the nonintersecting portion of said looped curve for said closed fluid circuit means effective to interconnect the passage means of said pumps, said twin turbine being responsive to the kinetic energy imparted to the fluid contained in said fluid circuit means to be driven in said one direction,
(d) and drive means effective to selectively connect and disconnect said pumps, said drive means being operable to provide a direct drive between said pumps whereby said pumps are conditioned for drive in the same direction at the same speed and brake means operable when engaged to hold one of said pumps stationary when said one pump is disconnected from the other of said pumps by said drive means to provide hydrodynamic braking.

14. In a hydrokinetic fluid drive,
(a) a hydrokinetic fluid drive unit comprising a pair of pumps, a twin turbine and a pair of stators providing closed fluid circuit means containing fluid and having a common central axis,
(b) said fluid circuit means providing a fluid path traced by a nonintersecting double looped curve whose loop centers are equidistant from said central axis,
(c) said pair of pumps having passage means providing the outer curvature of the looped portions of said looped curve for said closed fluid circuit means and being effective when driven in one direction to impart kinetic energy to the fluid contained in said fluid circuit means, said twin turbine being arranged between said pumps and said stators and having crossover passage means providing the nonintersecting portion of said looped curve for said closed fluid circuit means, said twin turbine being responsive to the kinetic energy imparted to the fluid contained in said fluid circuit means to be driven in said one direction,
(d) and drive means effective to selectively connect and disconnect said pumps, said drive means in a first selective condition being operable to provide a direct drive between said pumps whereby said pumps are conditioned for drive in the same direction at the same speed for normal fluid drive operation, in a second selective condition being operable to provide a reverse drive between said pumps whereby said pumps are conditioned for drive in opposite directions to provide one degree of hydrodynamic braking and brake means operable when engaged to hold one of said pumps stationary when said one pump is disconnected from the other of said pumps by said drive means to provide a lesser degree of hydrodynamic braking.

15. The hydrokinetic drive set forth in claim 14 and said drive means comprising a sun gear, a ring gear and a planet carrier having pinions meshing with said sun gear and said ring gear, said ring gear being drivingly connected to said other pump, said sun gear being drivingly connected to said one pump, a clutch operable when engaged to prevent relative rotation between said ring gear and said planet carrier whereby said first selective condition is effected and a brake operable when engaged to hold said planet carrier whereby said second selective condition is effected.

16. In a hydrokinetic fluid drive,
(a) a hydrokinetic fluid drive unit comprising rotary pump means and rotary turbine means having a common axis of rotation and providing fluid circuit means which contains fluid and provides a nonintersecting figure eight flow path,
(b) said flow path defined by a pair of rotary flow passages provided by said pump means and rotatable about said axis, and a pair of rotary flow passages provided by said turbine means and rotatable about said axis,
(c) one of said pair of flow passages having a substantially constant curvature,
(d) and the other of said pair of flow passages having substantially straight portions and portions having a radius of curvature at least equal to the minimum radius of curvature of said one pair of flow passages.

17. In a hydrokinetic fluid drive,
(a) a hydrokinetic fluid drive unit comprising rotary pump means and rotary turbine means having a common axis of rotation and providing closed fluid circuit means which contains fluid and provides a continuous flow path,
(b) said continuous flow path defined by a pair of rotary flow passages provided by said pump means and rotatable about said axis, and a pair of rotary flow passages provided by said turbine means and rotatable about said axis,
(c) one of said pair of flow passages having a substantially constant curvature,
(d) and the other of said pair of flow passages being arranged to cross over each other and having substantially straight portions and portions having an initial radius of curvature at least equal to the minimum radius of curvature of said one pair of flow passages.

18. In a hydrokinetic fluid drive,
(a) centrifugal pump passage means operable only by centrifugal action to supply fluid energy,
(b) turbine fluid passage means operable to extract fluid energy, (c) and one of said rotary fluid passage means having crossover passage means for cooperating with the other of said rotary fluid passage means to provide a closed fluid circuit having a continuous nonintersecting double looped flow path to establish a fluid drive connection between said input and output fluid passage means.

19. In a hydrokinetic fluid drive,
(a) a rotary input fluid passage means operable to supply fluid energy,
(b) rotary output fluid passage means operable to extract fluid energy,
(c) one of said rotary fluid passage means having crossover passage means for cooperating with the other of said rotary fluid passage means to provide a closed fluid circuit having a continuous nonintersecting double looped flow path to establish a fluid drive connection between said input and output fluid passage means, and
(d) said input and output fluid passage means having a common central axis of rotation, said loops having their centers located at the same radius from said axis.

References Cited

UNITED STATES PATENTS

| | | | |
|---|---|---|---|
| 1,199,359 | 9/1916 | Fottinger | 60—54 |
| 1,199,360 | 9/1916 | Fottinger | 60—54 |
| 1,269,338 | 6/1918 | Tourreil | 60—53 |
| 1,323,577 | 12/1919 | Brown | 60—54 |
| 1,855,967 | 4/1932 | Jandesek | 60—54 |
| 2,354,597 | 7/1944 | Jandesek | 74—688 |
| 2,549,557 | 4/1951 | Yancho | 74—650 |
| 2,623,408 | 12/1952 | Mayner | 60—54 X |

FOREIGN PATENTS

| | | |
|---|---|---|
| 556,074 | 7/1923 | France. |
| 346,710 | 1/1937 | Italy. |
| 121,656 | 3/1948 | Sweden. |

DONLEY J. STOCKING, *Primary Examiner.*

DAVID J. WILLIAMOWSKY, J. R. BENEFIEL,
*Examiners.*